US012644585B1

(12) United States Patent
Xu et al.

(10) Patent No.: US 12,644,585 B1
(45) Date of Patent: Jun. 2, 2026

(54) LED LAMP AND FIXING SUPPORT THEREOF

(71) Applicant: Guangdong SNC Technology Co., Ltd., Zhongshan (CN)

(72) Inventors: Jianyong Xu, Zhongshan (CN); Zhiping Ma, Zhongshan (CN); Xuangang Hou, Zhongshan (CN)

(73) Assignee: Guangdong SNC Technology Co., Ltd., Zhongshan (CN)

( * ) Notice: Subject to any disclaimer, the term of this patent is extended or adjusted under 35 U.S.C. 154(b) by 0 days.

(21) Appl. No.: 19/171,393

(22) Filed: Apr. 7, 2025

(30) Foreign Application Priority Data

Dec. 3, 2024 (CN) ......................... 202422962915.2

(51) Int. Cl.
*F21V 21/30* (2006.01)
*F21S 8/08* (2006.01)

(52) U.S. Cl.
CPC .............. *F21V 21/30* (2013.01); *F21S 8/088* (2013.01)

(58) Field of Classification Search
CPC ............. F21V 21/14; F21V 21/30; F21S 8/00
USPC .......................................................... 362/285
See application file for complete search history.

(56) References Cited

U.S. PATENT DOCUMENTS 8,960,971 B1 * 2/2015 Newton .................. F21S 8/036 362/371
10,718,500 B1 * 7/2020 Tylicki .................... F21V 21/30
2014/0211459 A1 * 7/2014 Toner ...................... F21V 33/00 362/396
2021/0262644 A1 * 8/2021 Sheehy ................. F21V 23/002

OTHER PUBLICATIONS

LEDMyPlace—LED Pole Light . . . Outdoor Area Street Security Lighting Fixture, Gen14B—1-Pack—https://www.ledmyplace.com/products/150w-led-pole-light-5700k-universal-mount-bronze-ac 120-277v?srsltid=AfmBOopZiTSkyUDaK2IRC-aiEvO-gTxB046AKN7ZLNq18BerehJFp86x ; accessed Oct. 8, 2025; First Available 2020 (Year: 2020).*
Yellore—400W Led Parking Lot Light with Photocell 60000LM ETL Listed LED Shoebox Pole Lights 5000K IP65 Waterproof 277-480VAC Input Outdoor Commercial Area Lighting with Slip Fitter—https://www.amazon.com/YELLORE-Photocell-Waterproof-277-480VAC-Commercial/dp/B0CPPFJH4H?th=1 ; accessed Oct. 8, 2025; (Year: 2021).*
Demilare (https://www.amazon.com/DEMILARE-Installation-Commercial-Photocell-Waterproof/dp/B0B6J3K73D/?th=1; accessed Oct. 8, 2025; First Available Date Feb. 12, 2021 (Year: 2022).*

* cited by examiner

*Primary Examiner* — Leah Macchiarolo

(57) ABSTRACT

An LED lamp and a fixing support of LED lamp are provided. The fixing support includes a support main body, the support main body includes a rotating member and a mounting base that are rotatably connected, the rotating member is connected to a lamp main body of the LED lamp through a fixing base of the LED lamp, the fixing base is fixed to the lamp main body through a fastener, and the mounting base is configured to be connected to a fixing object.

9 Claims, 8 Drawing Sheets

LED LAMP AND FIXING SUPPORT THEREOF

CROSS-REFERENCE TO RELATED APPLICATIONS

This application claims priority of Chinese Patent Application No. 202422962915.2, filed on Dec. 3, 2024, the entire content of which is incorporated herein by reference in its entirety.

TECHNICAL FIELD

The present disclosure relates to lighting devices, and in particular to an LED lamp and a fixing support thereof.

BACKGROUND

LED lamps can be mounted to various structures. For example, in outdoor applications, it may be necessary to mount the LED lamp to a lamp pole extending vertically, a lamp pole extending horizontally, or to a wall or other structure having a flat surface. Conventional fixing supports are usually integrated with the LED lamps, so that the structure of the fixing support of the LED lamp needs to be changed according to the site, which increases material and labor costs, and when the fixing support is damaged, the fixing support is not convenient to replace due to the integrated structure of the fixing support and the LED lamp.

SUMMARY

According to various embodiments, an LED lamp and a fixing support thereof are provided.

A fixing support of an LED lamp is provided, which includes a support main body. The support main body includes a rotating member and a mounting base that are rotatably connected, the rotating member is connected to a lamp main body of the LED lamp through a fixing base of the LED lamp, the fixing base is fixed to the lamp main body through a fastener, and the mounting base is configured to be connected to a fixing object.

In one of the embodiments, the rotating member includes a connecting member, the fixing base and the connecting member are each provided with a first wire receiving hole, an inner wall of the first wire receiving hole of the fixing base is provided with a sliding groove is provided on, and a sliding block is provided on an outer surface of the connecting member and is capable of sliding in the sliding groove.

In one of the embodiments, the first wire receiving hole located on the fixing base is aligned with the first wire receiving hole located on the connecting member.

In one of the embodiments, the connecting member is provided on a front end of the rotating member, a rear end of the rotating member is provided with first teeth, the mounting base is provided with second teeth, and the first teeth are engaged with the second teeth.

In one of the embodiments, the rotating member and the mounting base are each provided with a second wire receiving hole, and the rotating member and the mounting base are fixed by a screw.

In one of the embodiments, the mounting base includes a mounting base rear section and a fastening cover covering the mounting base rear section, and the fastening cover and the mounting base rear section enclose a mounting hole.

In one of the embodiments, the fixing support is configured to be fixed to the fixing object vertically or horizontally arranged through the mounting hole.

In one of the embodiments, the mounting base includes a mounting base rear section and a cover plate covering the mounting base rear section.

In one of the embodiments, a side of the mounting base away from the cover plate is connected to the fixing object, and a first mounting silicone pad or a second mounting silicone pad is provided between the mounting base and the fixing object.

An LED lamp is further provided, which includes a heat sink, an LED lamp panel, a lens plate, a driving power supply, and a fixing base. The driving power supply is configured to power the LED lamp panel, a front side of the heat sink is provided with a mounting groove, the LED lamp panel is fixedly mounted in the mounting groove, the lens plate covers on a light-emitting surface of the LED lamp panel, the fixing base is fixed on the heat sink through a fastener, the LED lamp further includes the above-mentioned fixing support, the fixing support further includes a connecting member, and the fixing support is connected to the fixing base through the connecting member.

According to the LED lamp, the LED lamp includes the fixing base and the fixing support, the fixing support includes the connecting member, and the sliding block on the outer surface of the connecting member is slidably engaged with the sliding groove of the fixing base. When the fixing base or the fixing support is damaged, it is more convenient to replace or maintain the fixing base or the fixing support. The bottom portion of the fixing support can be fixed on a lamp pole extending vertically or a lamp pole extending horizontally through the mounting hole. Alternatively, the side surface of the fixing support can be mounted on a wall with a flat surface or other structures, so that the fixing support can be mounted in a plurality of modes, and the cost for replacing the fixing support is saved.

The details of one or more embodiments of the application are set forth in the accompanying drawings and the description below. Other features, objects, and advantages of the application will be apparent from the description and drawings, and from the claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DESCRIPTION OF REFERENCE SIGNS

Figure 1:
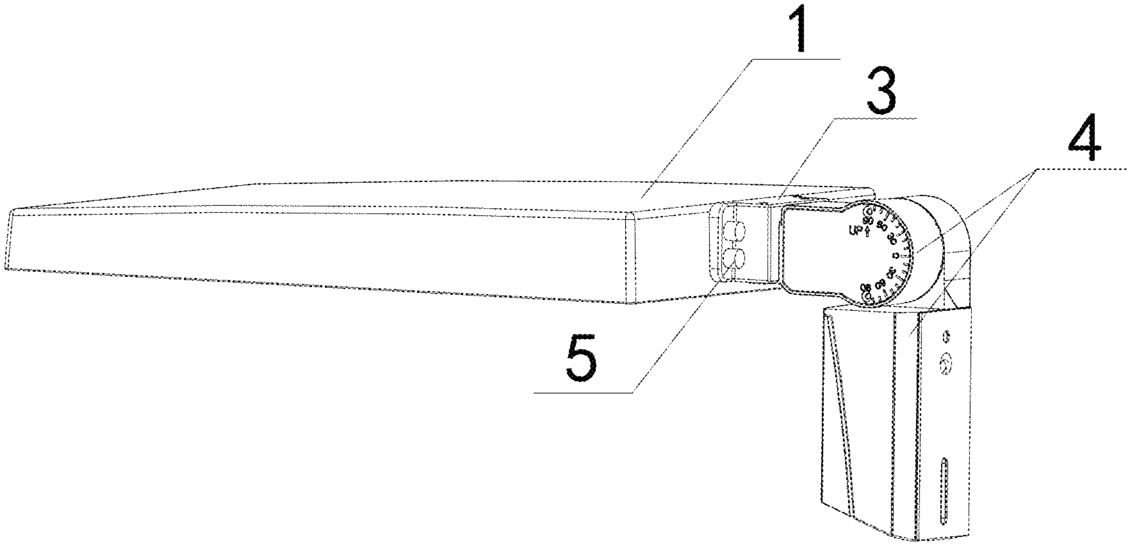
FIG. 1 is a perspective view of an LED lamp according to a first embodiment of the present disclosure.

1. Heat sink; 2. Lens plate; 3. Fixing base; 4. Support main body; 5. Fastener; 6. Rotating member; 7. Mounting base; 8. Connecting member; 9. First wire receiving hole; 10. Sliding groove; 11. Sliding block; 12. Fastening cover; 13. Mounting base front section; 14. Mounting base rear section; 15. Mounting hole; 16. First tooth; 17. Second tooth; 18. First screw hole; 19. Second screw hole; 20. Shielding cover; 21. Cover plate; 22. First mounting silicone pad; 23. Second mounting silicone pad; 24. Second wire receiving hole.

DETAILED DESCRIPTION OF THE EMBODIMENTS

The technical solution in the embodiment of the present disclosure will be clearly and completely described below in conjunction with the drawings in the embodiment of the application. Apparently, the described embodiments are only some of the embodiments of the application, not all of them. Based on the embodiments in the present disclosure, all other embodiments obtained by a person skilled in the art without making creative efforts shall all fall within the protection scope of the present disclosure.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Figure 2:
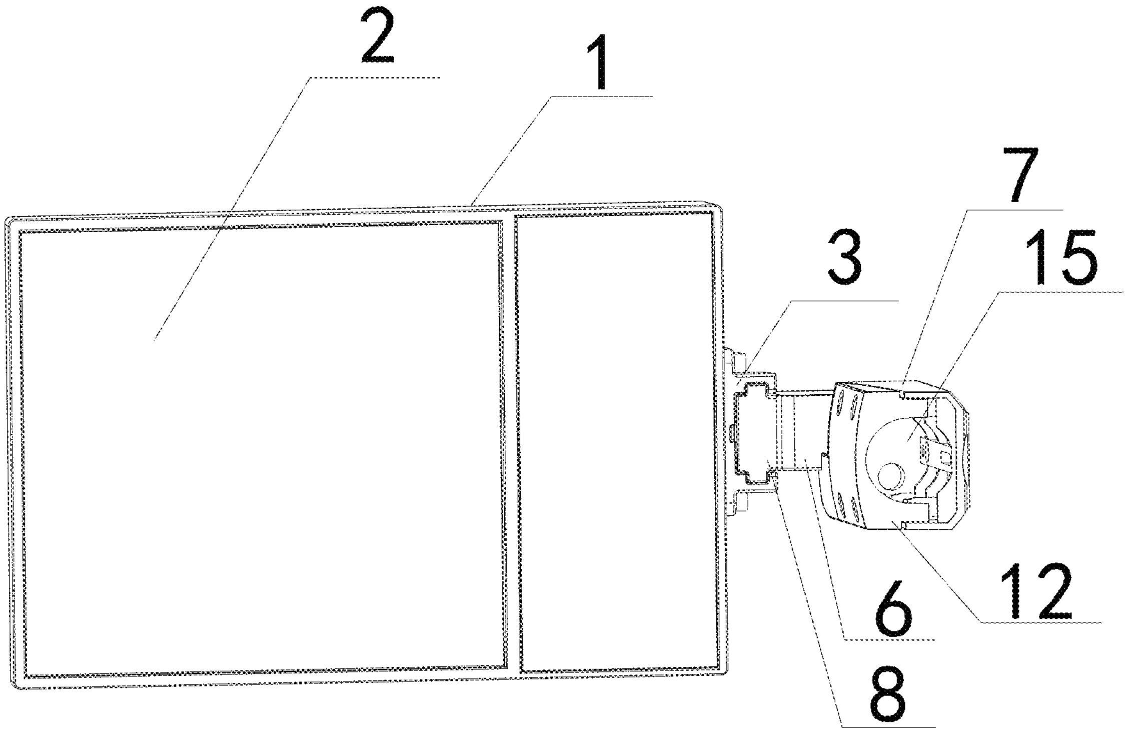
FIG. 2 is a perspective view of the LED lamp of FIG. 1 viewed from another aspect.
Figure 3:
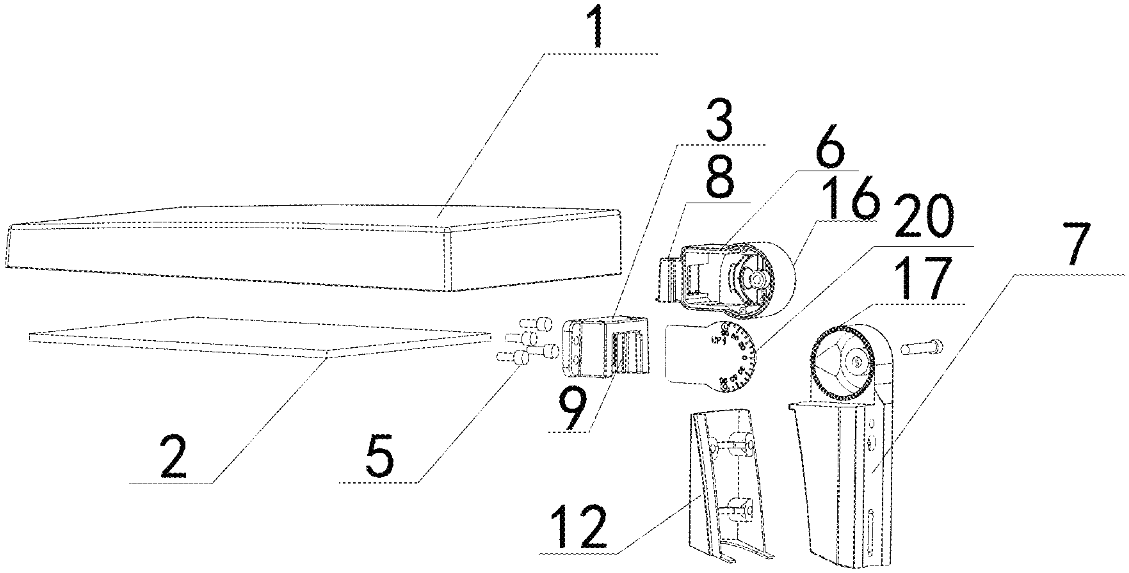
FIG. 3 is an exploded view of the LED lamp of FIG. 1.
Figure 4:
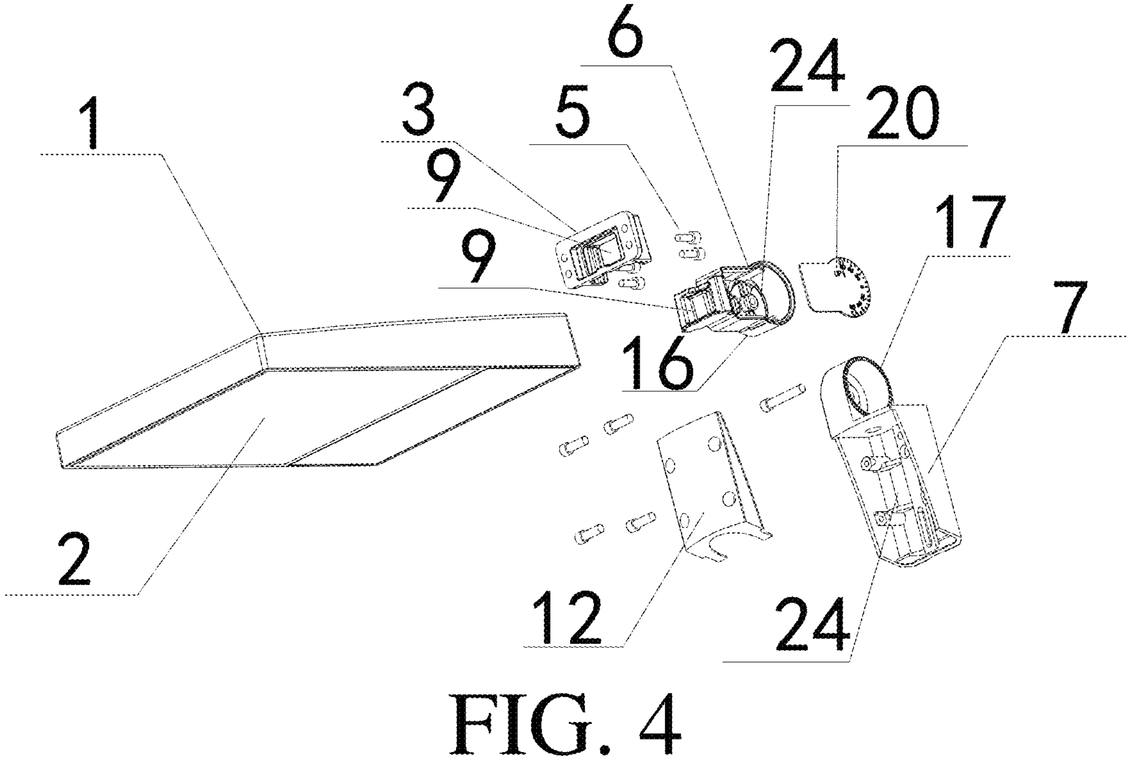
FIG. 4 is an exploded view of the LED lamp of FIG. 1 viewed from another aspect.
Figure 5:
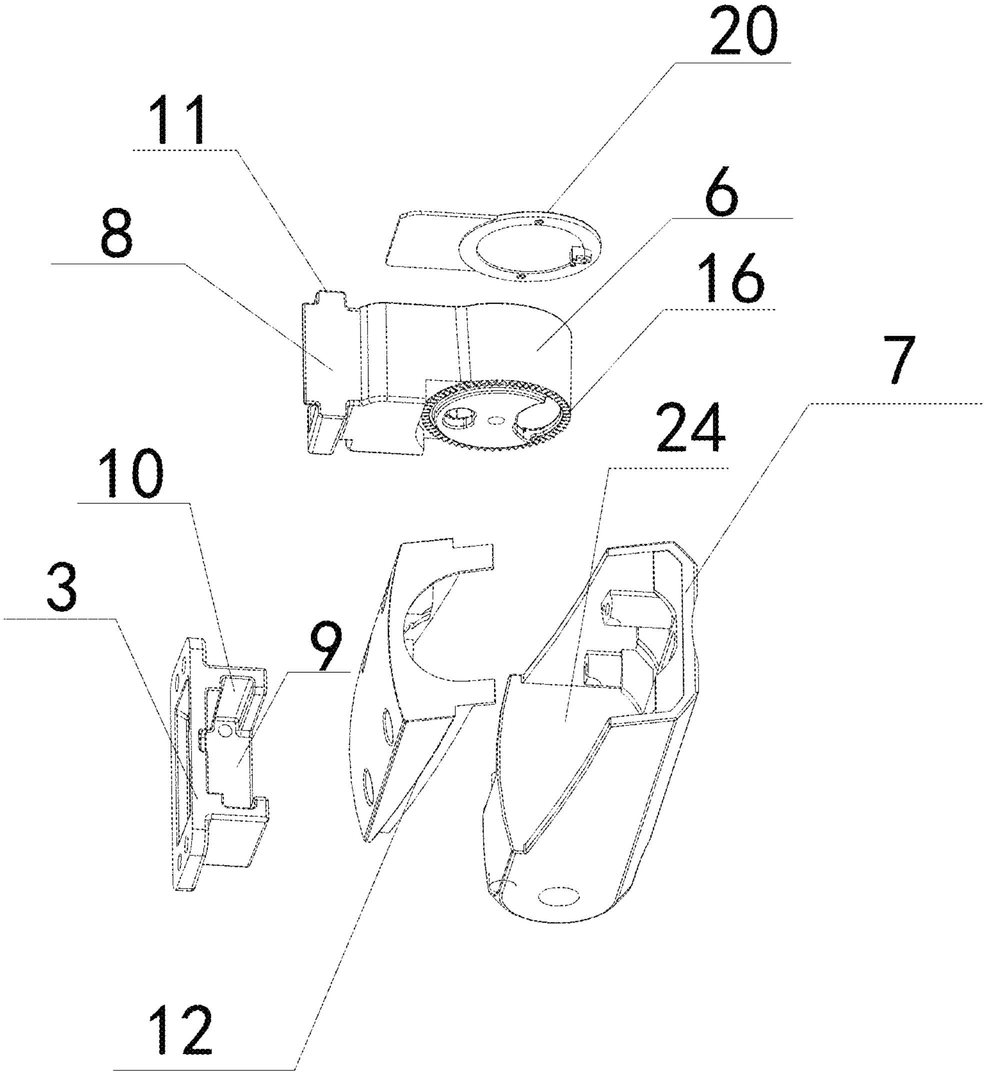
FIG. 5 is an exploded view of a fixing support in FIG. 1.
Figure 6:
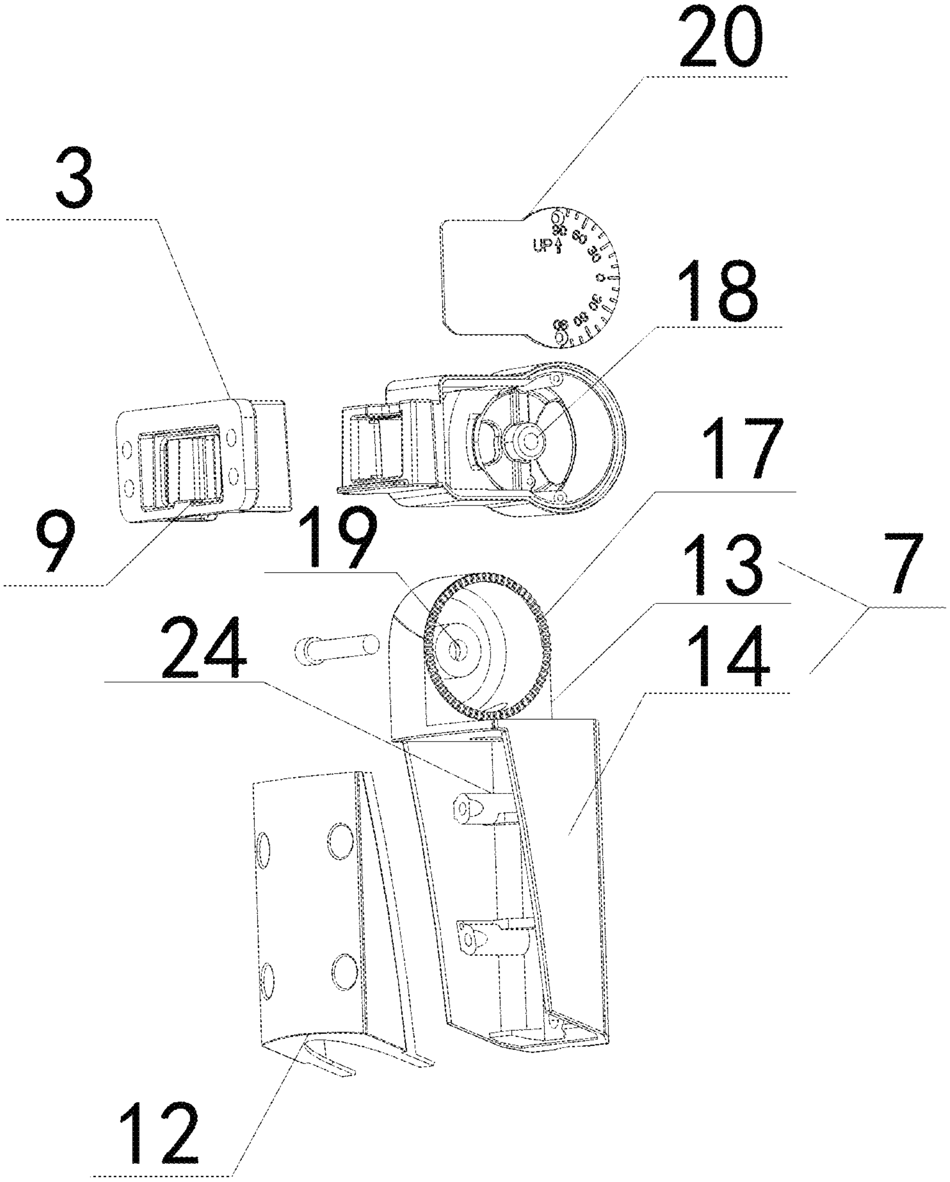
FIG. 6 is an exploded view of the fixing support in FIG. 1 viewed from another aspect.

Referring to FIGS. 1 to 6, an LED lamp according to a first embodiment is provided, which includes a heat sink 1, an LED lamp panel, a lens plate 2, and a driving power supply. The driving power supply is configured to power the LED lamp panel. A front side of the heat sink 1 is provided with a mounting groove. The LED lamp panel is fixedly mounted in the mounting groove. The lens plate 2 covers on a light-emitting surface of the LED lamp panel.

The LED lamp further includes a fixing base 3 and a fixing support. The fixing base 3 is fixed on the heat sink 1 through fasteners 5. The fasteners 5 may be screws. The fixing base 3 is fixed on the heat sink 1 through screws, so that when the fixing base 3 needs to be replaced, the fixing base 3 can be replaced only by unscrewing the screw and removing the fixing base 3.

The fixing support includes a support main body 4. The support main body 4 includes a rotating member 6 and a mounting base 7 that are rotatably connected. The rotating member 6 is connected to the heat sink 1 of the lamp main body through the fixing base 3. The mounting base 7 is configured to be connected to a fixing object.

The fixing support further includes a connecting member 8. The rotating member 6 is mounted on the fixing base 3 through the connecting member 8. The fixing base 3 and the connecting member 8 are respectively provided with a first wire receiving hole 9. A sliding groove 10 is provided on an inner wall of the first wire receiving hole 9 of the fixing base 3. Correspondingly, a sliding block 11 is provided on an outer surface of the connecting member 8 and is capable of sliding in the sliding groove 10. When mounting the fixing support, the sliding block 11 is aligned with the sliding groove 10 to be engaged with the sliding groove 10, and the fixing support can be fixed to the fixing base 3. When replacing the fixing support, the sliding block 11 is disengaged from the sliding groove 10, the fixing support is removed, and a new fixing support can be replaced.

The fixing base 3 is provided with a screw hole. Correspondingly, the connecting member 8 is also provided with a screw hole. After the sliding block 11 is engaged with the sliding groove 10, a screw is fixed in the screw holes of the fixing base 3 and the connecting member 8, so that the fixing base 3 and the connecting member 8 are fixed. In this way, the fixing support can be fixed on the fixing base 3 more stably.

The first wire receiving hole 9 located on the fixing base 3 is aligned with the first wire receiving hole 9 located on the connecting member 8. The rotating member 6 and the mounting base 7 are also each provided with a second wire receiving hole 24.

The mount seat 7 includes a mounting base front section 13, a mounting base rear section 14, and a fastening cover 12. The fastening cover 12 covers the mounting base rear section 14, and the fastening cover 12 and the mounting base 7 are fixed through screws. A bottom portion of the fastening cover 12 and a bottom portion of the mounting base rear section 14 are respectively provided with an arc-shaped notch, so that the bottom portion of the fastening cover 12 and the bottom portion of the mounting base rear section 14 enclose a mounting hole 15.

The fixing support is configured to be fixed to the fixing object vertically or horizontally arranged through the mounting hole 15. Specifically, when the fixing object is a lamp pole vertically arranged, the fixing support is mounted vertically, that is, the fixing support is vertically sleeved on the lamp pole through the mounting hole 15. When the fixing object is a lamp pole horizontally arranged, the fixing support is mounted horizontally, that is, the fixing support is horizontally sleeved on the lamp pole through the mounting hole 15.

The connecting member 8 is provided on a front end of the rotating member 6, and a rear end of the rotating member 6 is provided with first teeth 16. Correspondingly, the mounting base front section 13 is provided with second teeth 17. The first teeth 16 are engaged with the second teeth 17.

The rotating member 6 is provided with a first screw hole 18, the mounting base 7 is provided with a second screw hole 19, and the rotating member 6 and the mounting base 7 are fixed by screws. The screw can extend through the first screw hole 18 and the second screw hole 19 in sequence for fixation, or the screw can extend through the second screw hole 19 and the first screw hole 18 in sequence for fixation. When an angle of the rotating member 6 needs to be adjusted, the screw is loosened, the rotating member 6 is rotated to a required angle, and then the screw is tightened.

The LED lamp further includes a shielding cover 20. The shielding cover 20 covers the rotating member 6 and is provided with a dial, so that the operator can adjust the required angle more accurately. An adjustable angle range is 180 degrees, that is, the rotating member 6 can be adjusted 90 degrees left and right relative to the mounting base 7.

Figure 7:
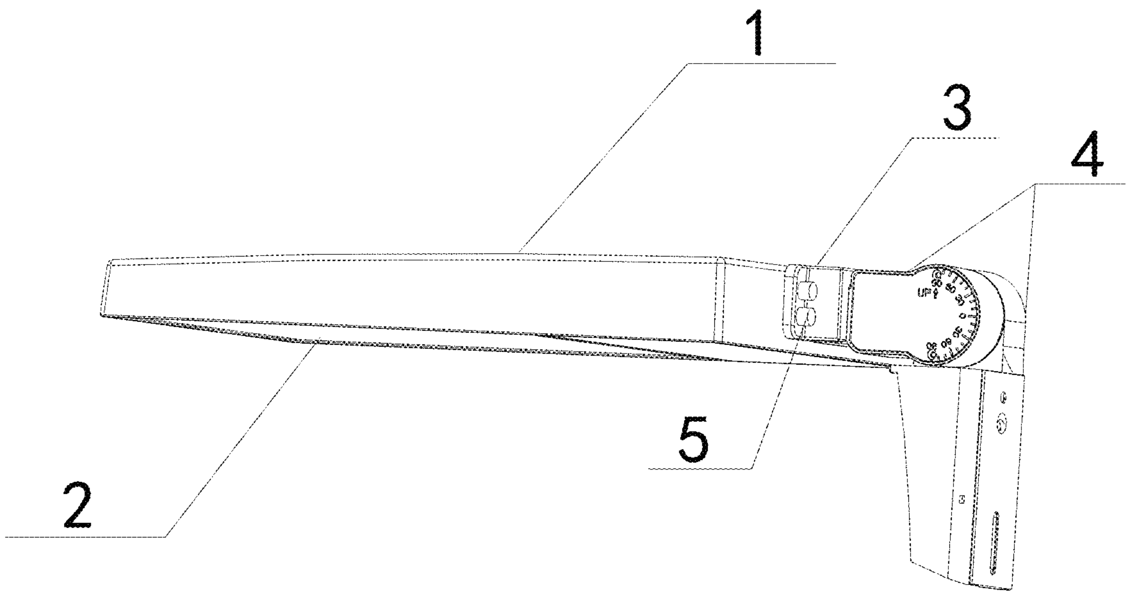
FIG. 7 is a perspective view of an LED lamp according to a second embodiment of the present disclosure.
Figure 8:
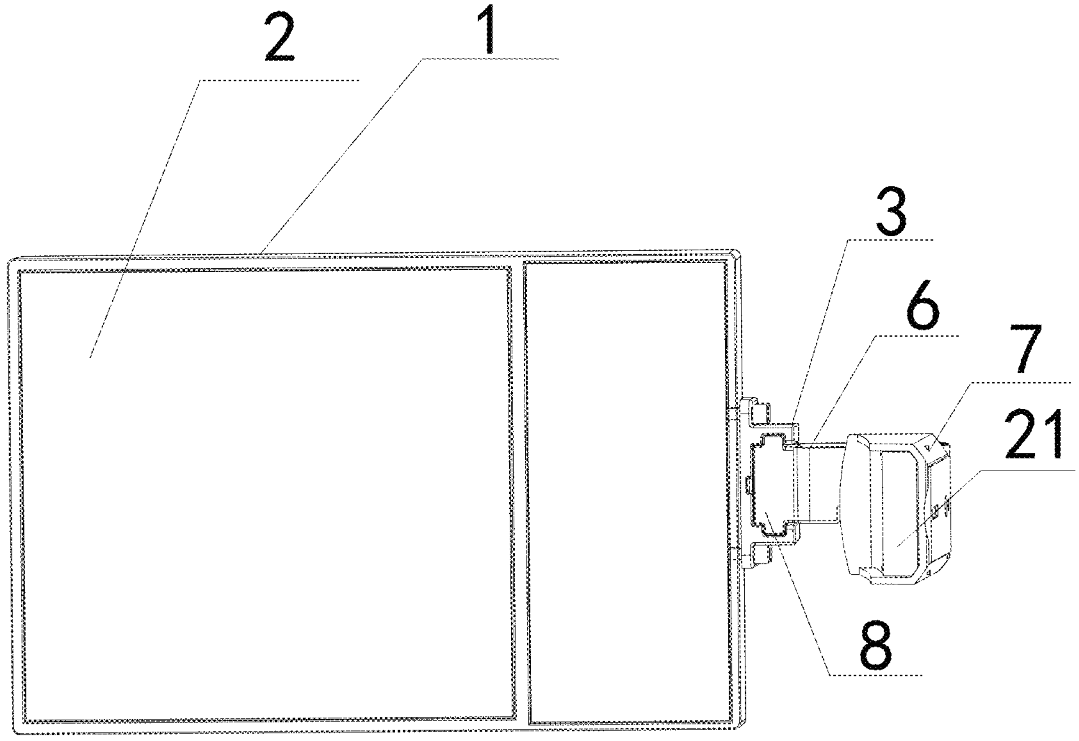
FIG. 8 is a perspective view of the LED lamp of FIG. 7 viewed from another aspect.
Figure 9:
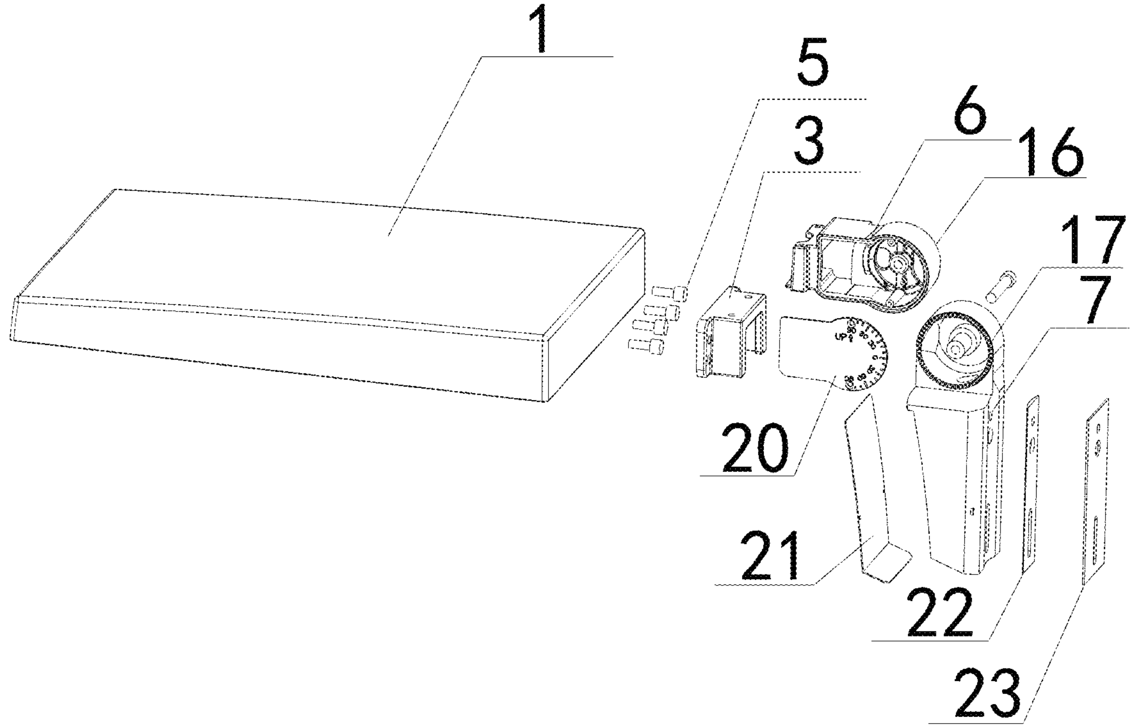
FIG. 9 is an exploded view of the LED lamp of FIG. 6.
Figure 10:
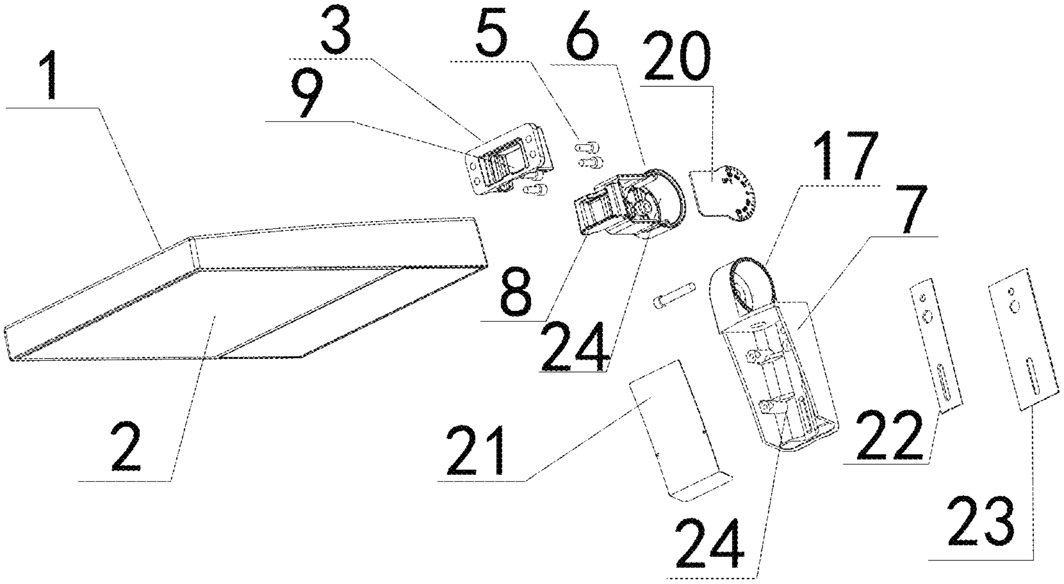
FIG. 10 is an exploded view of the LED lamp of FIG. 6 viewed from another aspect.
Figure 11:
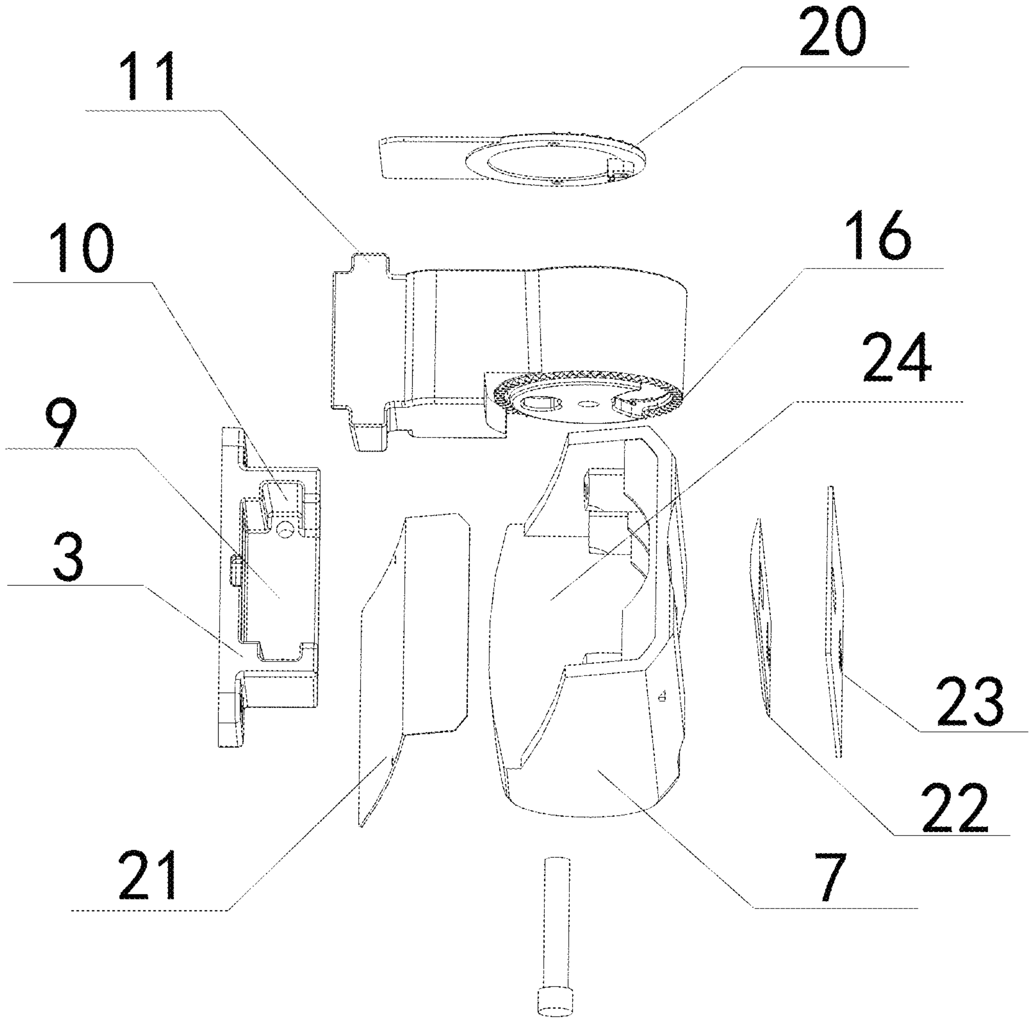
FIG. 11 is an exploded view of a fixing support in FIG. 6.
Figure 12:
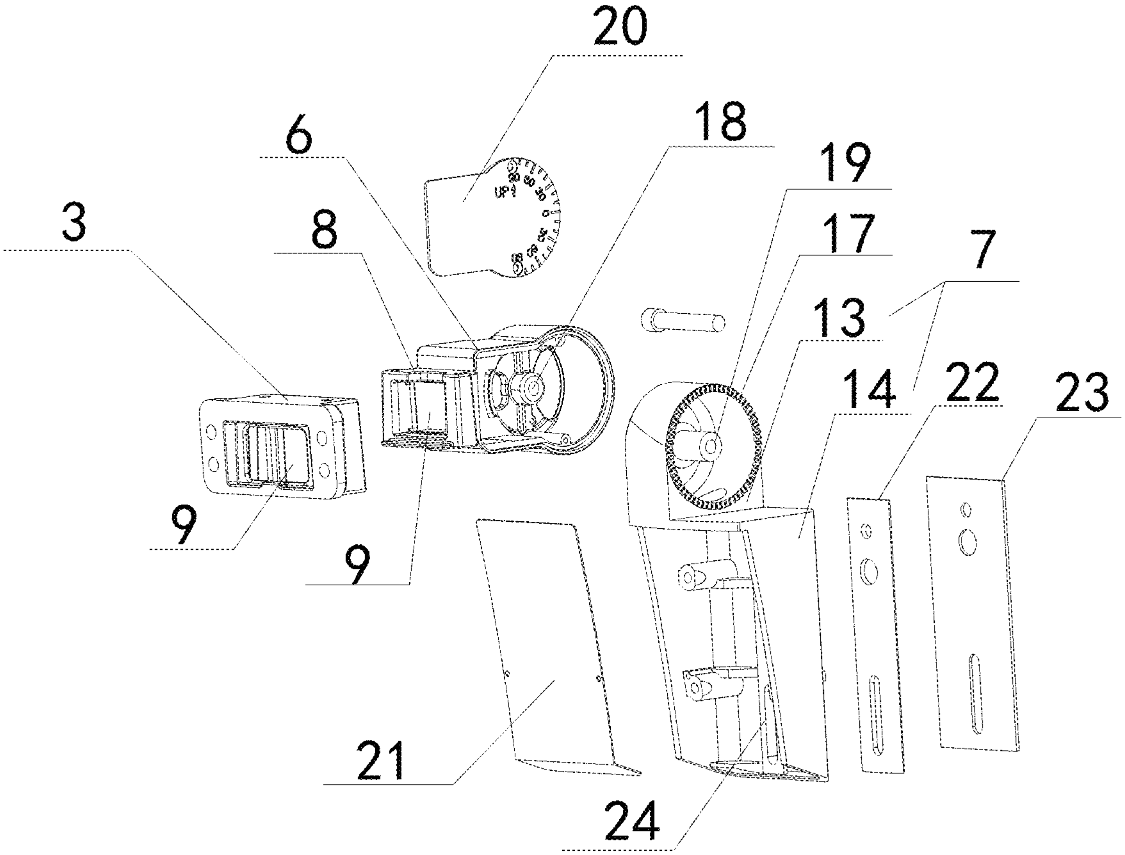
FIG. 12 is an exploded view of the fixing support in FIG. 6 viewed from another aspect.

Referring to FIG. 7 to FIG. 12, the structure of an LED lamp according to a second embodiment is similar to that of the first embodiment, and the difference lies mainly in that:

The mounting base 7 includes a cover plate 21 covering the mounting base rear section 14. A side of the mounting base 7 away from the cover plate is connected to the fixing object. A first mounting silicone pad 22 or a second mounting silicone pad 23 is provided between the mounting base 7 and the fixing object. The first mounting silicone pad 22 is a rectangular plate provided with a square mounting hole. The second mounting silicone pad 23 is a rectangular plate provided with a circular mounting hole.

The fixing support may be mounted on a wall or other structure having a flat surface. When the fixing object is a square pole, the first mounting silicone pad 22 is provided on the side of the mounting base 7. When the fixing object is a round pole, the second mounting silicone pad 23 is provided on the side of the mounting base 7.

According to the LED lamp, the LED lamp includes the fixing base 3 and the fixing support, the fixing support includes the connecting member 8, and the sliding block 11 on the outer surface of the connecting member 8 is slidably engaged with the sliding groove 10 of the fixing base 3. When the fixing base 3 or the fixing support is damaged, it is more convenient to replace or maintain the fixing base 3 or the fixing support. The bottom portion of the fixing support can be fixed on a lamp pole extending vertically or a lamp pole extending horizontally through the mounting hole 15. Alternatively, the side surface of the fixing support can be mounted on a wall with a flat surface or other structures, so that the fixing support can be mounted in a plurality of modes, and the cost for replacing the fixing support is saved.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A fixing support of an LED lamp comprising a support main body, wherein the support main body comprises a rotating member and a mounting base that are rotatably connected, the rotating member is connected to a lamp main body of the LED lamp through a fixing base of the LED lamp, the fixing base is fixed to the lamp main body through a fastener, and the mounting base is configured to be connected to a fixing object;

wherein the mounting base comprises a mounting base rear section and a cover plate covering the mounting base rear section, a side of the mounting base away from the cover plate is connected to the fixing object, a mounting silicone pad is provided between the mounting base and the fixing object, and the mounting silicone pad is provided with a square mounting hole or a circular mounting hole.

2. The fixing support of the LED lamp according to claim 1, wherein the rotating member comprises a connecting member, the fixing base and the connecting member are each provided with a first wire receiving hole, an inner wall of the first wire receiving hole of the fixing base is provided with a sliding groove, and a sliding block is provided on an outer surface of the connecting member and is capable of sliding in the sliding groove.

3. The fixing support of the LED lamp according to claim 2, wherein the connecting member is provided on a front end of the rotating member, a rear end of the rotating member is provided with first teeth, the mounting base is provided with second teeth, and the first teeth are engaged with the second teeth.

4. The fixing support of the LED lamp according to claim 3, further comprising a shielding cover, wherein the shielding cover covers the rotating member and is provided with a dial, so that the rotating member is adjusted to a required angle.

5. The fixing support of the LED lamp according to claim 1, wherein the first wire receiving hole located on the fixing base is aligned with the first wire receiving hole located on the connecting member.

6. The fixing support of the LED lamp according to claim 1, wherein the rotating member and the mounting base are each provided with a second wire receiving hole, and the rotating member and the mounting base are fixed by a screw.

7. The fixing support of the LED lamp according to claim 6, wherein the mounting base comprises a mounting base rear section and a fastening cover covering the mounting base rear section, and the fastening cover and the mounting base rear section enclose a mounting hole.

8. The fixing support of the LED lamp according to claim 7, wherein the fixing support is configured to be fixed to the fixing object vertically or horizontally arranged through the mounting hole.

9. An LED lamp, comprising a heat sink, an LED lamp panel, a lens plate, a driving power supply, and the fixing base, the driving power supply being configured to power the LED lamp panel, a front side of the heat sink being provided with a mounting groove, the LED lamp panel being fixedly mounted in the mounting groove, the lens plate covering on a light-emitting surface of the LED lamp panel, the fixing base being fixed on the heat sink through a fastener, wherein the LED lamp further comprises the fixing support according to claim 1, the fixing support further comprises a connecting member, and the fixing support is connected to the fixing base through the connecting member.

* * * * *